United States Patent [19]

Hartridge et al.

[11] Patent Number: 4,954,368

[45] Date of Patent: Sep. 4, 1990

[54] COATING COMPOSITIONS

[75] Inventors: Leonard S. G. Hartridge, Windsor; David W. Taylor, Reading; Roger L. Waters, Bucks, all of England

[73] Assignee: Imperial Chemical Industries PLC, London, England

[21] Appl. No.: 343,498

[22] Filed: Apr. 26, 1989

Related U.S. Application Data

[60] Division of Ser. No. 144,729, Jan. 14, 1988, Pat. No. 4,868,232, which is a continuation of Ser. No. 4,254, Jan. 5, 1987, abandoned, which is a continuation of Ser. No. 664,032, Oct. 23, 1984, abandoned.

[30] Foreign Application Priority Data

| Nov. 2, 1983 | [GB] | United Kingdom | 8329299 |
| Nov. 10, 1983 | [GB] | United Kingdom | 8329955 |
| Aug. 2, 1984 | [GB] | United Kingdom | 8419720 |

[51] Int. Cl.$^5$ ............................................. B05D 1/28
[52] U.S. Cl. .................................. 427/256; 427/385.5; 427/428
[58] Field of Search ................... 427/256, 385.5, 428

[56] References Cited

U.S. PATENT DOCUMENTS

| 3,139,646 | 7/1964 | Vernon | 15/257.06 |
| 3,536,187 | 10/1970 | Stafford | 206/361 |
| 3,602,939 | 9/1971 | Schoenholz | 15/252.06 |
| 4,196,107 | 4/1980 | Jones et al. | 524/506 |
| 4,407,997 | 10/1983 | Sighibartz | 524/561 |

FOREIGN PATENT DOCUMENTS

| 0922456 | 4/1963 | United Kingdom . |
| 1029723 | 8/1966 | United Kingdom . |
| 1362054 | 7/1974 | United Kingdom . |

Primary Examiner—Shrive Beck
Attorney, Agent, or Firm—Cushman, Darby & Cushman

[57] ABSTRACT

A solid, aqueous paint is contained in a lidded container comprising a tray adapted to receive a roller applicator. The paint comprises as essential ingredients a latex polymer dispersion, a thickener and a structuring agent selected from natural or synthetic clays, zirconium or titanium chelates, or a mixture of these agents. The solid paint is characterized by its achieving, after manufacture, specified criteria such as gel strength and viscosity within specified times and which are appropriate to its circumstances of containment and to its application properties from a roller applicator.

4 Claims, No Drawings

COATING COMPOSITIONS

This is a division of Application Ser. No. 07/144,729, filed Jan. 14, 1988, now U.S. Pat. No. 4,868,232 which is a CONT of Ser. No. 004,254 filed Jan. 5, 1987, now abandoned, which is a CONT of Ser. No. 664,032, filed Oct. 23, 1984, now abandoned.

This invention relates to aqueous coating compositions, more particularly to solid paints which are contained in a container comprising a tray adapted to receive a roller applicator.

Structured aqueous paints, i.e. paints which have a gel-like consistency and which exhibit thixotropy, are widely used. They have the advantages that they minimise dripping from an applicator and that they can provide coatings which are free from sags and are thicker than coatings provided by non-structured paints. The structured paints are applied frequently to substrates such as ceilings and walls by a roller applicator. In this case the structured paint is usually discharged into a tray from the conventional cylindrical container in which it has been purchased. The tray is adapted to receive a roller, although a brush or pad applicator may be used in conjunction with the tray.

Certain solid paints have been previously described, for example in U.S. Pat. Nos. 3,994,848 and 4,148,776, which depend upon ionic bonding and are intended for use in a hand-held box-like containerapplicator as described in U.S. Pat. No. 4,279,526. It is also known from U.S. Pat. No. 4,196,107 that certain other solid paints may be produced by gelling an aqueous dispersion of a water-reducible film-forming polymer in the presence of an electrolyte and a colloidal gelling agent. The colloidal gelling agent may be, for example, a colloidal silica. The solid paints thus produced, which are intended primarily for application by pad, have a gel structure due to this gelling system which is destroyed by the application of shearing forces, there being no recovery of a substantial gel structure contributed by this system These paints are stated to behave on a substrate as conventional paints, particularly with respect to flow and levelling. However, the paints described in U.S. Pat. No. 4,196,107 have certain disadvantages which stem largely from the presence of the colloidal gelling agent. For example, a material such as colloidal silica is a well known matting agent and therefore it hinders the formulation of compositions which will provide silk, or semi-gloss finishes. Further disadvantages which may result from the presence of colloidal silica in these paints include the extent to which free water will separate from the paint, sometimes termed "syneresis"; and an unevenness in sheen of a coating applied by roller applicator sometimes termed "sheeriness".

We have now found that certain, aqueous solid paints having specified rheological characteristics which are not irreversibly destroyed by shearing forces, and which are best applied by a roller applicator, can be produced and supplied in a ready-for-use container comprising a tray adapted to receive a roller applicator. These paints can be of two broad types; those intended to produce a coating with a relatively smooth, nontextured surface and those intended to produce a coating with a textured, patterned or relief surface, the latter sometimes being termed "texture" paints When formed into a shape, for example by the initial mixing of ingredients and their transfer to a rigid-walled container in which the solid paint is formed, the solid paints of the invention described hereunder will retain their shape for a significant period of time (for example at least 2 days) when, after a period of 4 weeks from preparation, a portion of the paint is removed from the container and supported on a horizontal surface The paints may achieve this character earlier than 4 weeks from manufacture but in any event they will attain this character by and retain it beyond 4 weeks from manufacture. Therefore these paints may be termed shape-retaining paints and in view of their appearance of solidity they may be distinguished from conventional structured paints, which do not exhibit this phenomenon of shape retention, by being termed "solid" paints.

According to this invention we provide a lidded paint container which contains an aqueous solid paint; the container comprising a tray which is adapted to receive a roller applicator and is closeable with the lid when not in use, the tray containing a highly structured shape-retaining solid aqueous paint which comprises as essential ingredients a latex polymer dispersion, a thickener and a structuring agent selected from natural and synthetic clays; titanium chelates; zirconium chelates; and mixtures thereof; the paint, (1) when intended to produce a coating having a relatively smooth, non-textured surface being characterised by,
   (a) a gel strength (as herein defined) of at least 100 g.cm when measured 4 weeks from manufacture and a gel strength of not greater than 400 g.cm when measured 1 year from manufacture, and
   (b) a viscosity (when measured by a technique, including a preshearing step, as herein defined) in the range 1.5 - 13 poise 4 weeks from manufacture, and which remains in this range 24 weeks from manufacture; or,
(2) when intended to produce a coating having a textured, patterned, or relief surface being characterised by,
   (a) a gel strength (as herein defined) of at least 100 g.cm when measured 4 weeks from manufacture and a gel strength of not greater than 400 g.cm when measured 1 year from manufacture, and
   (b) a viscosity (when measured by a technique, including a preshearing step, as herein defined) in the range 1.5 - 50 poise 4 weeks from manufacture and which remains in this range 24 weeks from manufacture.

Preferably the paint intended to produce a relatively smooth surface coating has a gel strength of at least 120 g.cm four weeks from manufacture of the paint; and preferably has a viscosity in the range 2-10 poise; more preferably 2-9 poise 24 weeks from manufacture. Preferably the gel strength is not greater than 300 g.cm 1 year from manufacture. Preferably the paint intended to produce a textured, patterned or relief surface has a viscosity in the range 2-20 poise four weeks from manufacture.

According to a specific aspect of this invention we provide a paint container which contains a highly structured aqueous paint, the container comprising a tray which is adapted to receive a roller applicator and is closeable with a lid when not in use, the tray containing a highly structured shape-retaining solid paint which comprises an emulsion polymer, a thickener and a structuring agent as herein defined the paint having a gel strength as herein defined of at least 100 g.cm four weeks after manufacture of the paint, a gel strength of not greater than 300 g.cm 1 year after manufacture of the paint and a viscosity as herein defined in the range 2–9 poise 24 weeks after manufacture of the paint.

Preferably the paint intended to produce a relatively smooth surface coating also has a viscosity in the range 0.5–2.0 poise four weeks from manufacture when measured with a high shear parallel plate viscometer.

We have found that a paint which has the composition, the "solidity" and the rheological characteristics defined above will possess, within a relatively short space of time from manufacture and for an indefinite period of time thereafter, the useful application properties which are associated with conventional structured aqueous paints, particularly when applied by a roller applicator in a conventional manner. Moreover the paint of this invention is taken up from the tray by a paint roller applicator in a quantity commensurate with that which is desired for good application conditions. In addition the "solidity" of the paint enables it to tolerate the conditions of transport, storage and useage to which it will be subjected when contained in the tray.

A suitable lidded container may be made of a plastics material, for example of polyethylene or polypropylene. The tray portion of the container may be of a shape which is broadly similar in principle to trays which are available for use with conventional structured paints in conjunction with a roller applicator but preferably it has side walls to which can be attached a closely-fitting lid, for example a snap-on lid which may be made from the same or a similar material from which the tray is made, in order to protect the paint when it is not in use. Preferably the tray has a carrying handle. One suitable container for the paint of this invention is described in European Patent Application No. 0124305 and comprises a tray of plastics material having a flexible handle attached to a side wall, the handle being moveable between a nonoperative position closely adjacent the wall, in which position empty trays (and including their handle) can be readily stacked within each other, and an operative, carrying position in which the handle is bent away from the wall of the tray. The walls, base and lid of a suitable container when made of a plastics material are preferably reinforced, for example by corrugations or by reinforcing struts, in order to resist distortion of the container, for example during transit. In a similar suitable container of plastics material the flexible handle is attached to a side wall in a manner which permits the stacking of empty trays, as well as easy carrying, but in which the handles of successive stacked trays project over the handle and the handle-carrying wall of the tray beneath it.

By a latex polymer dispersion we mean a polymer dispersion of the type known to be useful in the preparation of structured latex paints, and to have been prepared under conditions, for example by emulsion polymerisation, which enable any necessary subsequent interaction with a structuring agent, for example by polymerisation in the presence of a protective colloid. Suitable latex polymers in this invention include a wide range of homopolymers and copolymers of two or more ethylenically unsaturated monomers for example polymers containing units of vinyl acetate, $C_{1-8}$ acrylates and methacrylates such as methyl methacrylate, ethyl acrylate and 2-ethylhexyacrylate, styrene, butadiene, ethylene, vinyl chloride, vinylidene chloride, and the vinyl alcohol ester of "Versatic" acid (commercially available from Shell Chemicals). Particularly suitable latex polymers are those containing a high proportion of vinyl acetate units and those containing a high proportion of alkyl acrylate or methacrylate units.

Suitable thickeners are preferably based on cellulose and include for example carboxy methyl cellulose, hydroxy ethyl cellulose, hydroxy propyl methyl cellulose, hydroxy butyl methyl cellulose and hydroxy ethyl methyl cellulose. Other suitable thickeners include acrylic copolymers which comprise (meth)acrylic acid as a co-monomer. A combination of cellulosic and acrylic thickeners may be used.

The structuring agent to be used is selected from natural clays, particularly natural clays modified by amines which are commercially available under the Registered Trade Mark "Bentonite"; titanium chelates, for example those commercially available from Titanium Intermediates Ltd under the Registered Trade Mark "Tilcom"; zirconium chelates such as those commercially available from Magnesium Elektron under the Registered Trade Mark "Zirgel"; and synthetic clays such as are commercially available under the Registered Trade Mark "Laponite". Combinations of these materials may be employed, for example a combination of a natural clay with a zirconium chelate. The constitution of the zirconium and titanium chelates, and the choice of suitable latex polymer dispersions, is discussed in the technical literature issued by the suppliers mentioned.

The formulation of the paint will comprise other conventional ingredients, for example pigment, extender, coalescing solvent, surfactant or colloid. A "texture" paint may comprise further ingredients in order to achieve this effect. Although the nature of the latex polymer, thickener and structuring agent are the prime determinants of the characteristics of the paint, and the relative proportions of these must be chosen by the paint formulator to achieve the specified solidity, gel strength and viscosity criteria, as well as the performance criteria of a satisfactory conventional structured emulsion paint for example good opacity, good application characteristics such as good flow, and cleansibility, the effect of these other possible ingredients on the rheology of the paint are significant and must be taken into account.

In general we prefer to use 0.1–10% by weight, preferably 0.4–2% by weight, of the structuring agent, based on the total weight of the formulation, when a chelate. Rather higher proportions of the clays are usually required, for example up to 20% by weight. Preferably there is present 0.1–6% by weight of the thickener, for example 0.1–1% by weight of a cellulosic thickener based on the total weight of the formulation. The proportion of latex polymer present can vary between wide limits, for example between 5% and 60% by weight based on the total weight of the formulation.

We have found that a particular requirement of a solid aqueous paint of the type herein described to be supplied in a tray, is that it must have a low "water throw", sometimes termed syneresis. On storage of many structured emulsion paints a quantity of water separates from, and remains on the surface of, the paint, for example when contained in a conventional can. Whereas this is not a serious disadvantage with structured paints held in cans it is not acceptable for the solid paints of this invention which do not have a water throw of greater than 1 cc per 30 sq.cm. of the surface of the paint in the tray.

The gel strength of the paints of this invention is defined as the gel strength as determined by the ICI/-

Sheen Gel Strength Tester (which is commercially available from Sheen Instruments (Sales) Ltd, 9 Sheendale Road, Richmond, Surrey) when using a blade of dimensions 3 × 1 cm.

The viscosity of the smooth and textured paints of this invention which is to lie in the range of 1.5-13 poise and 1.5-50 respectively four weeks from manufacture is defined as the viscosity when determined by the ICI/Sheen Rotothinner (commercially available from Sheen Instruments (Sales) Ltd.) but when the technique is modified by a pre-shearing of the sample at high speed for 4 minutes.

A further viscosity measurement may be made on the paints of this invention using a high-shear parallel plate viscometer. When the paints are for smooth coatings the viscosity should be preferably in the range 0.5-2.0 poise.

All of the gel strength and viscosity measurements referred to in this specification were taken at 25° C.

The invention is illustrated by the following Examples in which parts and percentages are by weight.

EXAMPLE 1

This Example describes the preparation of a pigmented solid paint which will provide a coating of matt appearance when applied to a substrate by a roller applicator.

20.00 parts of a rutile titanium dioxide were dispersed in a high-speed mixer with 25.00 parts of water, 0.13 part of a 20% aqueous solution of a fungicide, 1.00 part of ethylene glycol as anti-freeze additive, 2.00 parts of white spirit as coalescing solvent, 1.60 parts of an ionic dispersant, 0.15 part of an antifoam additive, 0.40 part of sodium carboxy methyl cellulose as thickener and 8.34 parts of china clay, 8.67 parts of chalk and 2.50 parts of diatomaceous earth.

This dispersion was then well mixed with 20.17 parts of a methyl methacrylate/2-ethylhexyl acrylate acrylic copolymer latex of 52% solids content prepared by emulsion polymerisation, 0.15 part of ammonia and 9.14 parts of water. 0.75 part of a zirconium chelate structuring agent, commercially available as Zirgel K, ("Zirgel" is a Registrered Trade Mark of Magnesium Elektron) were mixed with the resulting pigmented latex and the final product was immediately passed into trays made of a plastics material so that each tray was substantially filled to the level of its side walls. A sheet of plastics material was laid over the top of the product in the tray and a closely fitting lid was attached.

After storage for 4 weeks from manufacture the gel strength of the product was 150 g.cm and the viscosity of the product was within the range 2-10 poise. After storage for 24 weeks from manufacture the viscosity was still within the range 2-10 poise and after 1 year from manufacture the gel strength did not exceed 300 g.cm.

A roller applicator was used to apply to a ceiling the product which had been stored for 4 weeks. There was far less spatter of paint than with conventional paints and the paint had good flow and levelling properties.

EXAMPLE 2

This Example describes the preparation of a pigmented solid paint which will provide a coating having a silk-like appearance when applied to a substrate by a roller applicator.

20.00 parts of rutile titanium dioxide were dispersed in a high-speed mixer with 12.495 parts of water, 0.5 part of a fungicide, 2.00 parts of ethylene glycol as anti-freeze agent, 1.70 parts of an anionic surfactant, 0.625 part of a non-ionic surfactant, 7.0 parts of chalk, 0.15 part of an anti-foam agent, 0.15 part of sodium carboxy methyl cellulose as thickener, and 1.25 parts of benzyl alcohol as coalescing agent. This dispersion was then well mixed with 44.2 parts of a vinyl acetate/vinyl ester of "Versatic" acid copolymer latex of 50% solids, 0.03 part of 0.880 ammonia, 7.85 parts of water; 0.15 part of antifoam agent and 1.50 parts of an acrylic acid copolymer.

0.40 part of a titanium chelate commercially available from Tioxide Intermediates Ltd as "Tilcom" AT 33 were mixed with the resulting pigmented latex and the final product immediately passed into trays etc, as described in Example 1.

After storage for 4 weeks from manufacture the gel strength of the product was 110 g.cm and the viscosity of the product was within the range 2-9 poise. After storage for 24 weeks from manufacture the viscosity was still within the range 2-9 poise and after 1 year from manufacture the gel strength did not exceed 300 g.cm.

The application properties of the product, which provided a coating of silk appearance were similar to those of the product of Example 1.

We claim:

1. A method for providing a coating of paint on a substrate with less spattering of the paint wherein the method comprises the steps of
   (1) providing a container comprising a tray adapted to receive a paint roller and closable by a lid,
   (2) providing in the tray an aqueous structured solid paint which comprises as essential ingredients a latex polymer dispersion, a thickener and a structuring agent selected from natural and synthetic clays, titanium chelates, zirconium chelates, and mixtures thereof so that the paint has either I
   (a) a gel strength of at least 100 g.cm when measured 4 weeks from manufacture and a gel strength of not greater than 400 g.cm when measured 1 year from manufacture and
   (b) a viscosity (when measured by a technique, including a preshearing step) in the range 1.5 to 13 poise 4 weeks from manufacture and which remains in this range 24 weeks from manufacture
   when it is intended to provide a coating having a relatively smooth non-textured surface II
   (a) a gel strength of at least 100 g.cm when measured 4 weeks from manufacture and a gel strength of not greater than 400 g.cm when measured 1 year from manufacture,
   (b) a viscosity (when measured by a technique, including a preshearing step) in the range 1.5 to 50 poise 4 weeks from manufacture and which remains in this range 24 weeks from manufacture
   when it is intended to provide a coating having textured, patterned or relief surface,
   (3) closing the tray with a lid to permit transport and storage of the solid paint,
   (4) removing the lid from the tray to enable the tray to receive a paint roller and (5) taking up paint from the tray onto a paint roller and applying the taken up paint to the substrate by means of the paint roller.

2. A method according to claim 1 wherein the structured solid paint is provided in the tray by mixing the latex polymer dispersion, the thickener and the structuring agent and passing the mixture immediately into the tray whereafter the paint develops its solid structure.

3. A method according to claim 1 wherein after the paint has been provided in the tray, the paint and the tray are stored for a period of at least 4 weeks before the paint is taken up onto the paint roller.

4. A method as claimed in claim 1 in which the amount of structuring agent in the solid aqueous paint is 0.1 to 10% by weight of the solid aqueous paint.

* * * * *